(12) United States Patent
Theroux et al.

(10) Patent No.: US 8,533,197 B2
(45) Date of Patent: Sep. 10, 2013

(54) CONTINUOUS CONTENT SHARING THROUGH INTELLIGENT RESOLUTION OF FEDERATED HIERARCHICAL GRAPHS

(75) Inventors: Michael Theroux, Milford, NH (US); Itai Berman, Ramat-Gan (IL)

(73) Assignee: Bladelogic, Inc., Houston, TX (US)

( * ) Notice: Subject to any disclaimer, the term of this patent is extended or adjusted under 35 U.S.C. 154(b) by 345 days.

(21) Appl. No.: 13/074,653

(22) Filed: Mar. 29, 2011

(65) Prior Publication Data
US 2012/0254113 A1 Oct. 4, 2012

(51) Int. Cl.
*G06F 17/00* (2006.01)
(52) U.S. Cl.
USPC .......... 707/740; 707/608; 707/687; 707/790; 707/821; 707/912
(58) Field of Classification Search
USPC ............. 707/608, 687, 790, 821, 953, 912, 707/636, 740, 769
See application file for complete search history.

(56) References Cited

U.S. PATENT DOCUMENTS

| | | | |
|---|---|---|---|
| 2007/0226224 A1* | 9/2007 | Wanigasekara-Mohotti et al. | 707/10 |
| 2010/0205179 A1* | 8/2010 | Carson et al. | 707/740 |
| 2012/0254113 A1* | 10/2012 | Theroux et al. | 707/636 |
| 2013/0080467 A1* | 3/2013 | Carson et al. | 707/769 |

* cited by examiner

*Primary Examiner* — Sana Al Hashemi

(57) ABSTRACT

Systems, methods and computer readable media for media for continuous content sharing between systems through intelligent resolution of federated hierarchical graphs are described. A Multi-Topology Middleman (MTM) is used between the source and target systems to handle the content sharing. The MTM builds on traditional import/export infrastructure; it tracks the import/export of individual objects between systems. When a conflict is found between systems, the MTM learns the conflict resolution and stores the conflict resolution as a rule for the conflicting object, and applies the rule for subsequent import/export process on that object. The MTM also tracks the mapping of objects between the source and target systems and updates the target object in accordance with a change in the source object. The MTM is also capable of undoing the import process.

19 Claims, 7 Drawing Sheets

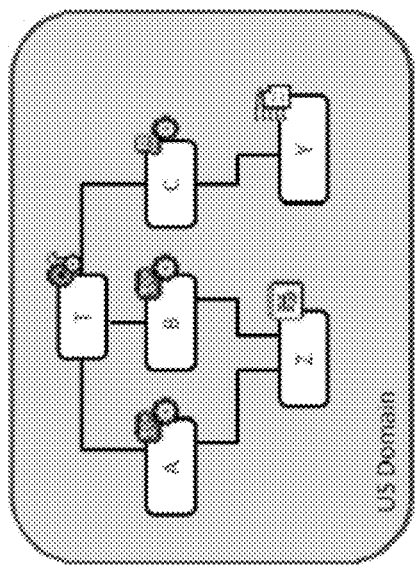
FIG. 3A
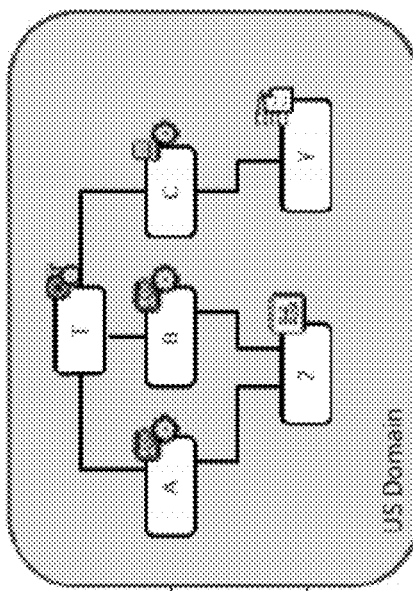
FIG. 3B
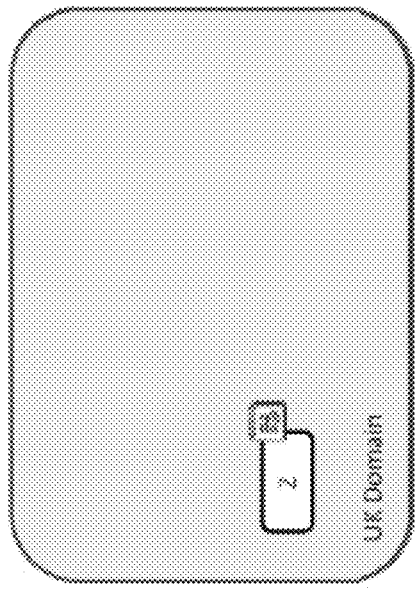
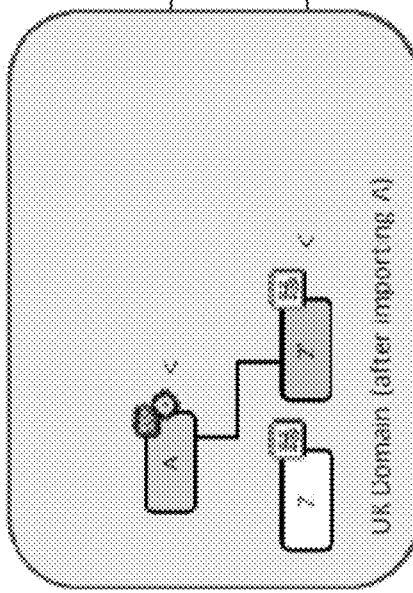

CONTINUOUS CONTENT SHARING THROUGH INTELLIGENT RESOLUTION OF FEDERATED HIERARCHICAL GRAPHS

BACKGROUND

This disclosure relates generally to the field of computing. More particularly, but not by way of limitation, this disclosure relates to a technique for providing continuous content sharing through intelligent resolution of federated hierarchical graphs.

In most enterprise products, the instances of a product may be distributed across geographically diverse locations. There is a need to manage and share content utilized in many instances of a product. There are a number of different approaches to content sharing between these instances; however, each introduces its own set of problems.

One approach is to logically connect product instances at the database layer through data replication and distributed locking, with the goal of keeping content identical across all instances of the product, as illustrated in FIG. 1. Although possible, this solution, particularly over geographically dispersed locations, is fragile due to the latency and unreliable nature of wide area network links. In today's geographically dispersed IT organizations, the data synchronization among different instances is usually impractical or impossible. Usecases such as the incorporation of new domains through company acquisition also make this practice difficult. In a large distributed system, "emergency" changes to local domains are also unavoidable in the day-to-day running of those systems.

Another very common approach is to export content from one domain (product instance), and import it directly into another domain. Although the import/export solution works in simple scenarios, there are scenarios in which the content conflicts cause serious stumbling blocks for customers. The numbers of ways content can conflict are enormous, and how they are resolved can be daunting. Either content has to be merged, or, in a worst-case scenario, the content may have to be imported into the target system as a completely separate set of objects.

There is a need, therefore, for a simple, elegant mechanism to address the problem of content sharing between domains.

SUMMARY

Various embodiments disclose systems, methods and computer readable media for continuous content sharing between systems through intelligent resolution of federated hierarchical graphs. The disclosed mechanism utilizes a Multi-Topology Middleman (MTM) to handle the content sharing between systems. The MTM builds on traditional import/export infrastructure; it tracks the import/export of individual objects between systems. When a conflict is found between systems, the MTM stores the conflict resolution as a rule for the conflicting object. The conflict resolution rule may be applied for subsequent import/export process on that object. The MTM may also enable an object from one system to be imported to another system with the imported object assuming a new identity in the target system. In one embodiment, the MTM tracks the mapping of objects between the source and target systems so that the MTM updates the target object in accordance with a change in the source object. In still another embodiment, the MTM is also capable of undoing the import process.

In another embodiment, an intelligent content sharing system is disclosed that includes a processor, a storage subsystem coupled to the processor, and a software program, application or module stored in the storage subsystem, comprising instructions that when executed by the processor cause the processor to perform one of the methods described above.

In still another embodiment, a non-transitory computer readable medium is disclosed wherein the non-transitory computer readable medium (i.e., a program storage device) has instructions for causing a programmable control device to perform one of the methods described above.

In yet another embodiment, a networked computer system is disclosed that includes a plurality of computers communicatively coupled, at least one of the plurality of computers programmed to perform at least a portion of a method described above wherein the entire method is performed collectively by the plurality of computers.

BRIEF DESCRIPTION OF THE DRAWINGS

FIGS. 3A, 3B and 3C illustrate an exemplary content sharing between two systems using an intelligent content sharing system.

DETAILED DESCRIPTION

Figure 1:
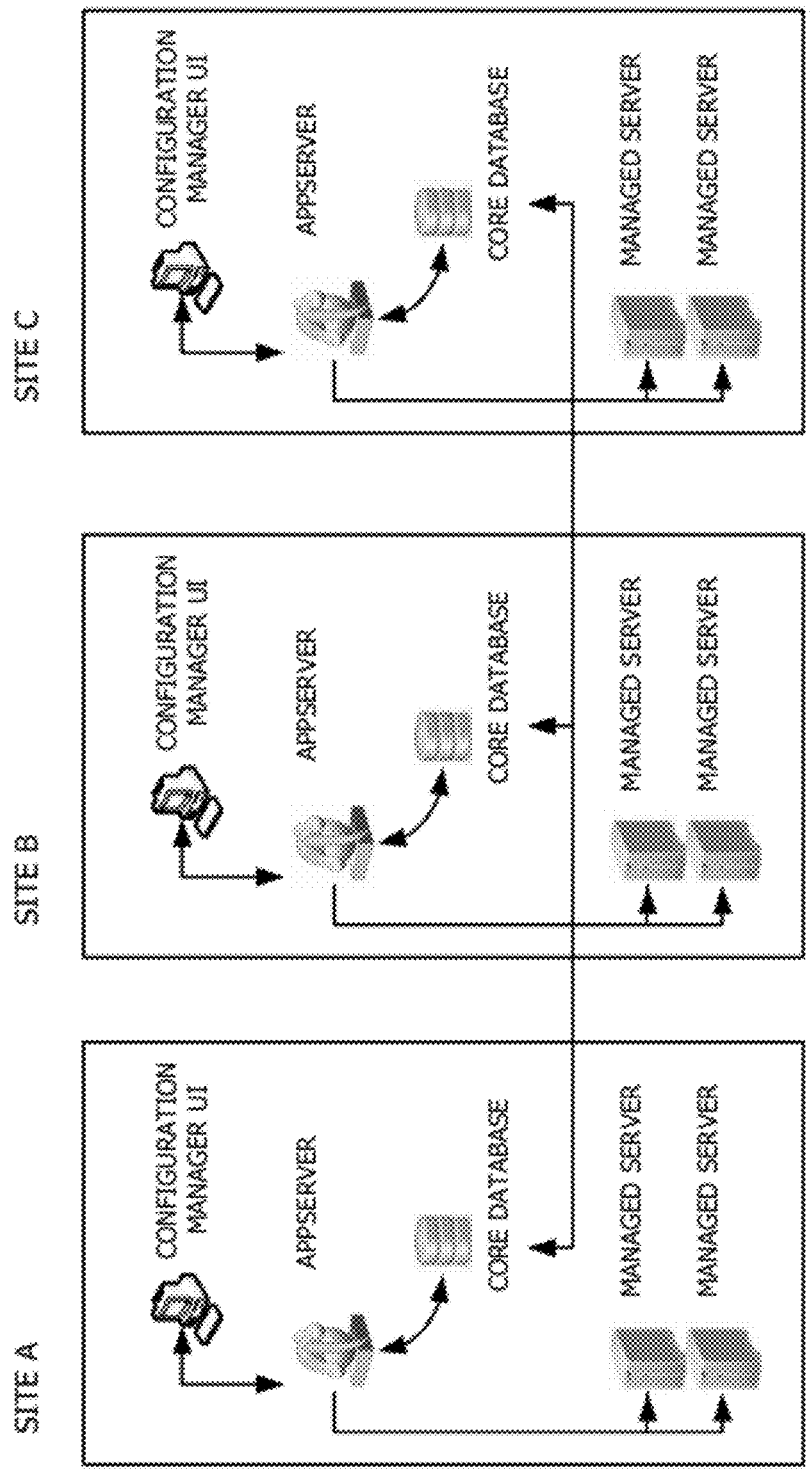
FIG. 1 illustrates a prior art of sharing contents between domains by keeping identical copies of data across the domains.

Various embodiments disclose systems, methods and computer readable media for continuous content sharing between systems through intelligent resolution of federated hierarchical graphs. The disclosed mechanism utilizes a Multi-Topology Middleman (MTM) to handle the content sharing between systems. The MTM builds on traditional import/export infrastructure; it tracks the import/export of individual objects between systems. According to one embodiment, the MTM receives a request from a user to share content between systems. The MTM exports the content from the source system, and publishes the content to a data fabric, which will be described in details below. The metadata of the content is also copied to the MTM. The MTM then previews potential conflicts on the target system. If the preview returns potential conflicts, the MTM queries rule database for related conflict resolution rules associated with the sharing object. The MTM may also let the user decide how to resolve the conflict, and stores the conflict resolution as a rule. The MTM then copies necessary payloads using a data fabric, and import data applying the conflict resolution rules.

In the following description, for purposes of explanation, numerous specific details are set forth in order to provide a thorough understanding of the invention. It will be apparent to one skilled in the art, however, that the invention may be practiced without these specific details. In other instances, structure and devices are shown in block diagram form in order to avoid obscuring the invention. It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the art having the benefit of this disclosure. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The instant disclosure builds upon infrastructure of traditional import/export systems. Traditional import/export mechanism is well known to an ordinary skilled in the art. Many existing products provide import/export functionalities which export content from a source domain, and import that content into a target domain. However, traditional import/export systems have difficulties resolving conflicts between the content imported and the content on the target system.

When content is imported into the target domain, the objects contained in the target domain may conflict with the objects to be imported. There are many types of conflicts that may exist in an object hierarchy. Some conflicts maybe simple and require little user intervention to resolve. For example, the data in an object to be imported may be a superset of the data available in the target domain. In this case, simply replacing the data in the target domain with the data to be imported would resolve the conflict. Other conflicts maybe very difficult to resolve, for instance, the object hierarchy between the source and target domains may be inconsistent.

A sophisticated exchange process may be required even without the appearance of conflicts. In some use cases, different sites may organize object hierarchies differently, requiring a continuous exchange process to map and maintain the identities.

Figure 2:
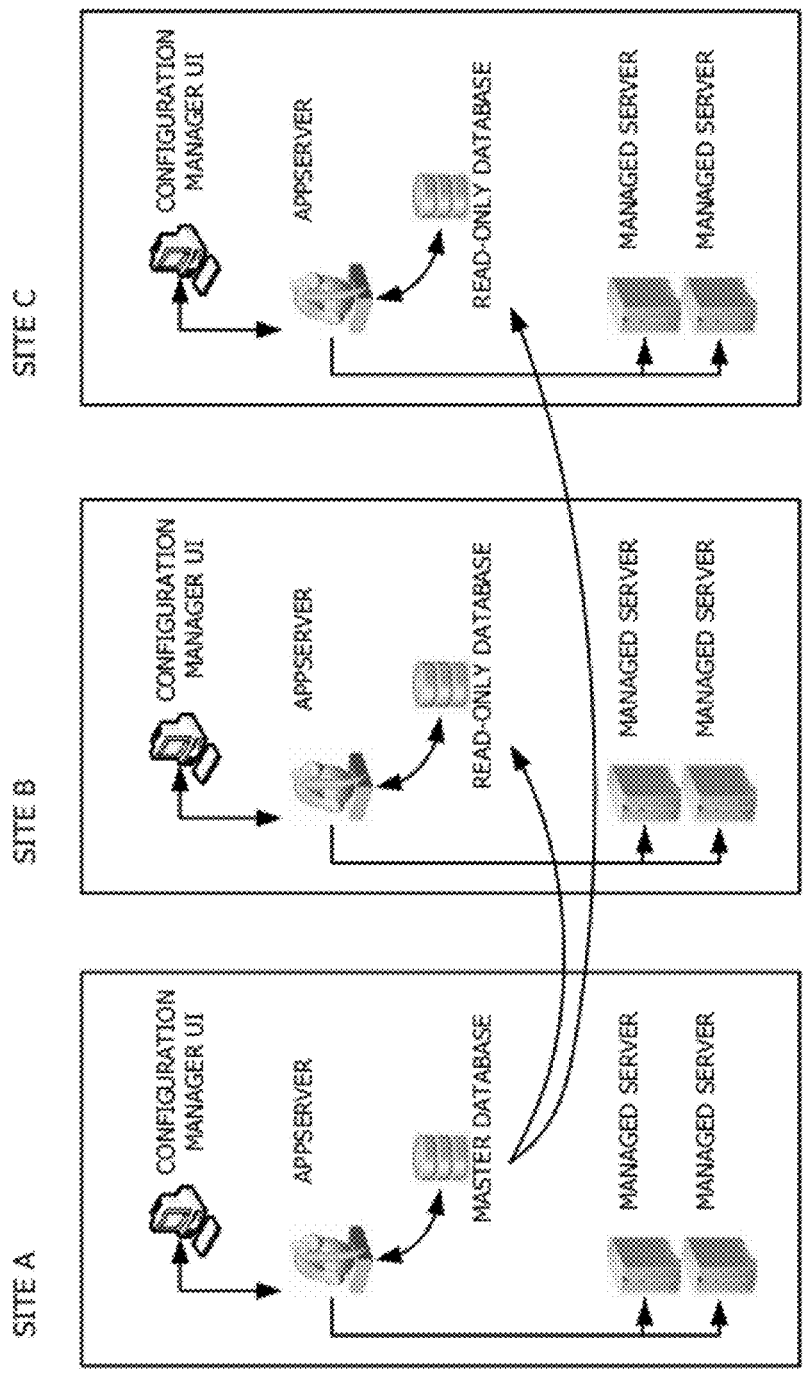
FIG. 2 illustrates a prior art of sharing contents between domains through regular import/export strategies.

Some enterprise solutions attempt to eliminate import complexities by having a single source for all content, as illustrated in FIG. 2. The content is created and manipulated only from a single location. The imported content always overwrites the content in the target domain. This is essentially the same as locking content in the target domain such that they cannot be changed. While simple, this approach does not address a number of important requirements, for instance, certain content may be regulated, and not allowed in different jurisdictions, while other content must be shared across domains, etc. The simple Master/Slave replication strategy is untenable in the face of such requirements.

While the import/export problem may seem trivial at first glance, the issue becomes more complex when content exists in multiple systems, but shares common logical dependencies. It becomes even more complex if the content is simultaneously being modified on multiple systems. Resolving and coordinating these changes across these different systems can prove to be problematic. As an example, we may have regulatory content residing on multiple sites in different countries. Although the different sites share most of the content, some adjustments need to be done to fit the specific regulations in each country. Here as well, naïve replication would be insufficient.

When content is frequently shared, the resolution of conflicts becomes problematic and repetitive. For example, if you are importing content "Foo" into another product installation, and that content already exists in that other domain, a user may decide that the objects are different enough that a new object "Foo2" should be created in the target domain. If "Foo" is later changed, and the user wished to re-import "Foo" into the target domain, the user will need to remember they previously renamed "Foo" to "Foo2".

The situation becomes much more complex when content consists of hierarchies of objects, in which sub-objects can be exported independently of their parent objects. In the example discussed above, if object "Foo" had a child object "Bar", and "Bar" was previously imported into the target domain as "Bar2", a user who later imports "Foo" would need to know this child object was previously renamed. In addition, "Bar" could have been used by another piece of content, "Baz". If Baz is imported into this same domain, its shared dependency, "Bar", should be updated to reflect the previous decision to rename "Bar" to "Bar2". Direct import/export solutions that allow content creation and manipulation on source and target domains inherently have these problems.

According to one embodiment, an intermediary component, a Multi-Topology Middleman (MTM), is placed between the source and target domains of the import/export process to handle the conflict resolution tasks. The Multi-Topology Middleman tracks the import/export of individual objects between domains. When a conflict of an object is found between the domains, the MTM stores how that conflict for that object is resolved as a conflict resolution rule. This conflict resolution rule may be applied for that object in future import/export operations.

Conflicts of objects between domains are resolved on a per-object basis. How a conflict is resolved on one object may be different from how a conflict is resolved on another object. A conflict of a parent object may be resolved differently than that of a child object. In one embodiment, a user may be provided with multiple possible conflict resolution choices. The MTM may store and reuse all conflict resolution choices.

FIG. 3 illustrates an exemplary embodiment of employing the Multi-Topology Middleman to share objects between two systems: Domain US and Domain UK. Initially, as shown in FIG. 3A, the US domain has objects A, B, C, T, Y and Z, and the UK domain has an object Z. Both domains contain an object named Z, though these two objects may not be the same.

If a user decides to share object A in Domain US to Domain UK, the MTM first exports the required content for object A from the source domain (US Domain). In the scenario illustrated in FIG. 3, object A depends on object Z, therefore both object A and object Z will be exported. Next, the MTM proceeds to import the content to the target domain (UK Domain), and discovers that object Z from the source domain conflicts with object Z already in the target domain. The MTM then presents to the user a few options for resolving the conflict. The user may choose one of the options provided by the MTM to resolve the conflict; the user may also come up with a new conflict resolution. For example, the user may choose to overwrite object Z in the UK Domain to match object Z in the US Domain.

Figure 3C:
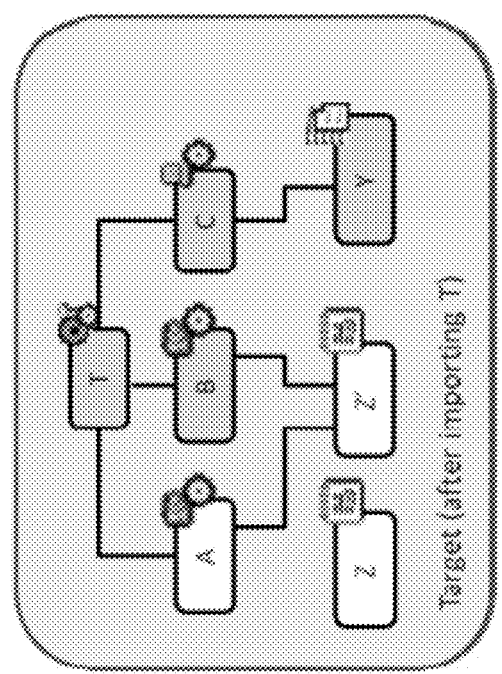

The user may want to keep object Z in the UK Domain, but also want to have object A imported to the UK Domain using the same object Z as in the US Domain. In order to achieve that, the user may decide to import object Z into the UK Domain using a different name—Z', and have the imported object A reference to this new object Z', as illustrated in FIG. 3B. The MTM may record this conflict resolution as a rule for object Z: whenever object Z in Domain US is shared with Domain UK, change the identity of shared object Z in Domain UK to Z'. Now, if the user subsequently tries to share other objects in the US Domain that reference object Z, for example object T, or even object Z itself, no user intervention will be necessary as the existing rule will be automatically applied to cause object Z to be renamed to object Z' upon import. FIG. 3C illustrates the UK Domain after sharing object T at a later stage, with the transparent application of the rule that renames object Z to object Z'.

The user may make additional modifications to object Z in the US Domain. These modifications will be reflected when object Z is shared to the UK Domain and renamed to Object Z'. A user may also make modifications to object Z' in the UK Domain. In this case, when a user later tries to again share object Z in the US Domain to the UK domain, additional conflicts may arise between object Z in the US Domain and object Z' in the UK Domain, and these conflicts need to be resolved before object Z can be shared. The resolution for these additional conflicts is recorded as an additional rule. This additional rule would be executed sequentially after the renaming rule is executed.

The MTM's capability of sequential execution of rules may enable a robust multi-step conflict resolution engine, and equip the MTM with a holistic view of the exchange process where several particular merge decisions are integrated in a compatible manner. An even more complicated case may arise when the modifications made in the UK Domain require an additional renaming of object Z' to Z". This may leave object Z, Z', and Z" all present in the target domain. In this case, the MTM records the renaming of Z' to Z" as a rule and applies it after the execution of the rule of renaming Z to Z'.

In one embodiment, instead of renaming object Z to a new object on the target domain, object Z can be remapped to an object already existing on the target domain. For example, the use may remap object Z to object Y whenever object A is shared between the US Domain and UK Domain, and the MTM records this as a rule. This rule would then be applied automatically whenever object A is shared once it has been established in the MTM.

If multiple users are making simultaneous changes to content in multiple domains that cannot be resolved through traditional conflict resolution functionalities, then it may be necessary to maintain the multiple revisions of that object simultaneously, as the change to the underlying object was so severe that simple resolution was not possible. In one embodiment, versioning of the object hierarchy is implemented to simplify the situation. When versioning is used, the "renaming" rule would associate object Z with a specific version of object Z in the target domain (instead of to the latest version).

Figure 4:
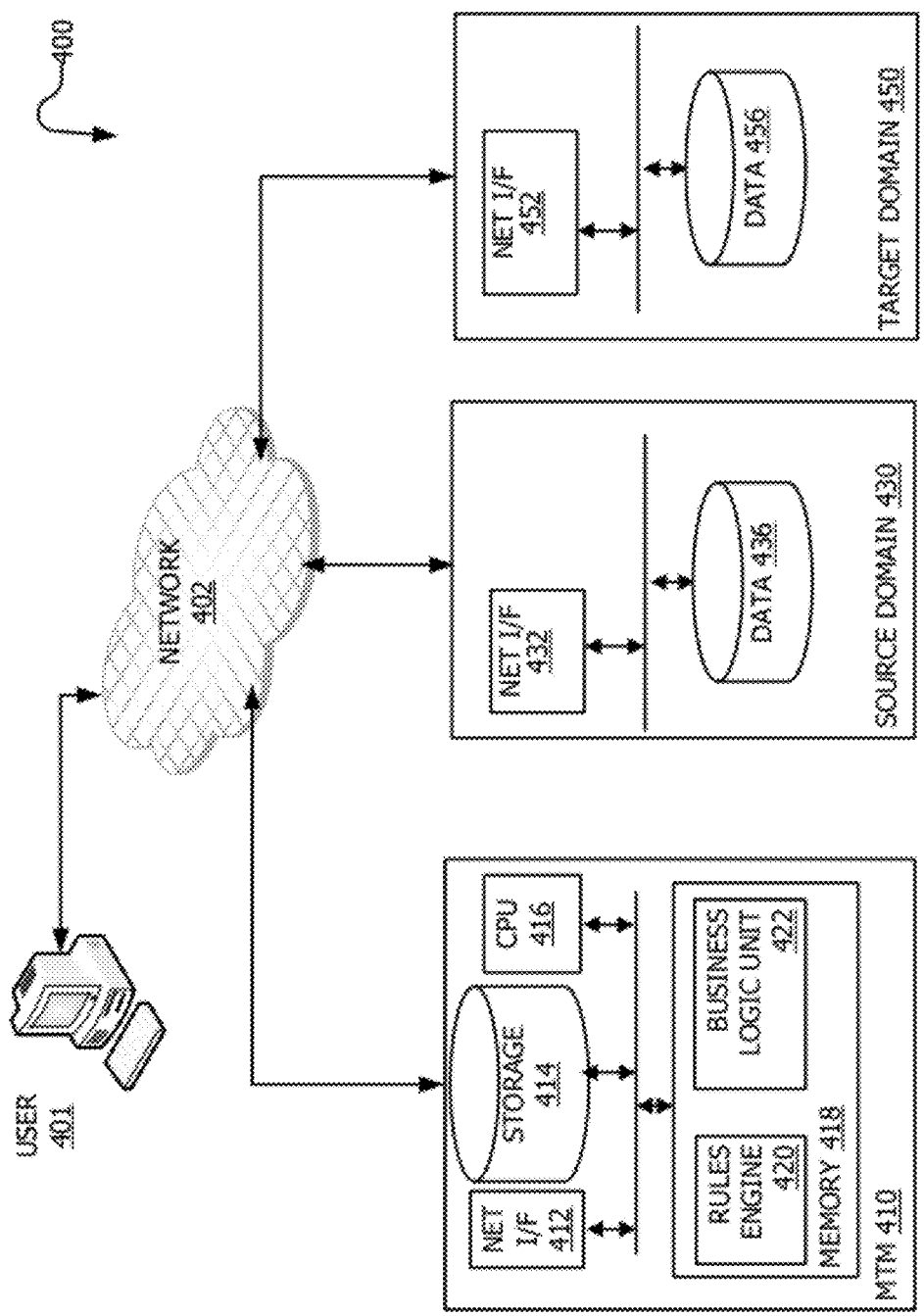
FIG. 4 illustrates an example exemplary intelligent content sharing system according to one embodiment.

Referring now to FIG. 4, an exemplary system that implements object sharing between domains using the Multi-Topology Middleman is illustrated. System 400 includes MTM 410 coupled to network 402, which provides connectivity between MTM 410, one or more user nodes 401, one or more source domains 430, and one or more target domains 450. Such connectivity is provided via each system's network interface (e.g., network interfaces 412, 432 and 452). Example MTM 410 includes Rule Engine 420 and Business Logic Unit 422, which are loaded into memory 418 and executed by CPU 416. MTM 410 also includes persistent storage device 414 (e.g., a hard disk drive), used to store configuration settings of Rule Engine 420 and Business Logic Unit 422. Rules for object sharing between domains may also be stored on storage device 414. MTM 410 communicates with source domain 430 and target domain 450, exports data from source domain 430 and imports data into target domain 450.

Business Logic Unit 422 comprises an import/export system which exports information into an independent format that can later be imported into another system. Rule Engine 420 stores, retrieves, and applies rules for object sharing between domains. Rules are applied based on their scope.

Rule Engine 420 and Business Logic Unit 422 comprise a collection of functional blocks. Each functional block may be implemented as a separate software component using, for example, any number of conventional programming languages including C, C++, Java®, and so on. (JAVA is a registered trademark of the Oracle Cooperation.) Furthermore, it will be appreciated by those skilled in the art that not every embodiment need require every functional block shown in FIG. 4, or may include additional functional blocks which have been left out of FIG. 4 to avoid obscuring the disclosed embodiment with unnecessary detail. Software code modules implementing the functional blocks and representing customization detection system 400 may reside and execute on a single machine, or may be distributed in some meaningful manner to reside and execute on multiple machines.

The MTM may learn how to share content between domains and record the sharing mechanism as a rule for the shared object and the source and target domains. In general, rules are defined on a specific object/specific source domain and target domain basis, however generic rules that encompass all objects import/export operations may also be possible. A rule may also be applied to all instances of an object, or only instances of an object that exists as a child of another object.

The rules have a lifecycle independent of the objects, but refer to the identity of the objects. As a result rules can be defined independently of the objects, allowing users to pre-define rules without going through the import process. The rules may be defined and/or edited by a user through a graphical user interface. In one embodiment, a user can define the rules directly using a text-based language.

Adding a new rule to the MTM is contingent upon a verification that the new rule doesn't conflict with any other merge rules, and that the resulting set of rules is cohesive and valid. For example, adding a rule instructing an object Z in the source system to override object Z in the target system will be denied when a rule mapping Z to Z' already exists. Similarly, the existence of a rule mapping Z to Z' will preclude the addition of a rule mapping Z' to Z as the aggregation of the two rules will result in an infinite loop.

There may have two types of rules that can exist within the system: conflict resolution rules and data manipulation rules. Conflict resolution rules represent how differences between objects are resolved. Conflict resolutions rules consist of the source identity of the object, a target identity, a status, an action, and some additional meta-data. The conflict resolution rules exist independently from the content. Exemplary conflict resolution rules for an object include, but are not limited to, keeping the existing object; having the new object override the old one; merging the old and the new objects; importing the object using an alternative name/location, and updating all references of the object to the new name/location accordingly; and skipping importing the new object, re-map the object to an alternative object in the target system, and update all references of the object to that existing object, etc. Data manipulation rules indicate additional changes that need to be made to the objects after the import process is complete. These rules may contain higher-level and less generalized actions, such as the update of security information and other meta-data after the import is complete.

According to one embodiment, applying global conflict resolution rules by Rule Engine 420 to all objects may provide preemptive conflict resolution: a user may express conflict resolution rules to be applied prior to a conflict being first identified. For example; a rule could instruct the import system to overcome name clashes of objects by renaming the conflicting objects in a pre-defined manner (one such renaming example is adding a "'" sign to the end of the name).

Once conflict resolution rules are in place and complete, the transfer of objects can happen at any time without user intervention. In one embodiment, a user may automate the import/export of data between systems by defining rules generically and applying the rules to a wide set of use-cases. For example, automating the import/export process may allow data synchronization between product installations without user intervention and without the requirement that data remains identical between installations. A distributed environment may be configured to be synchronized on a daily basis. In another embodiment, an environment could be configured to be continuously synchronized, such that each content change in one of the sites triggers an exchange process that synchronizes the other sites transparently.

Figure 5:
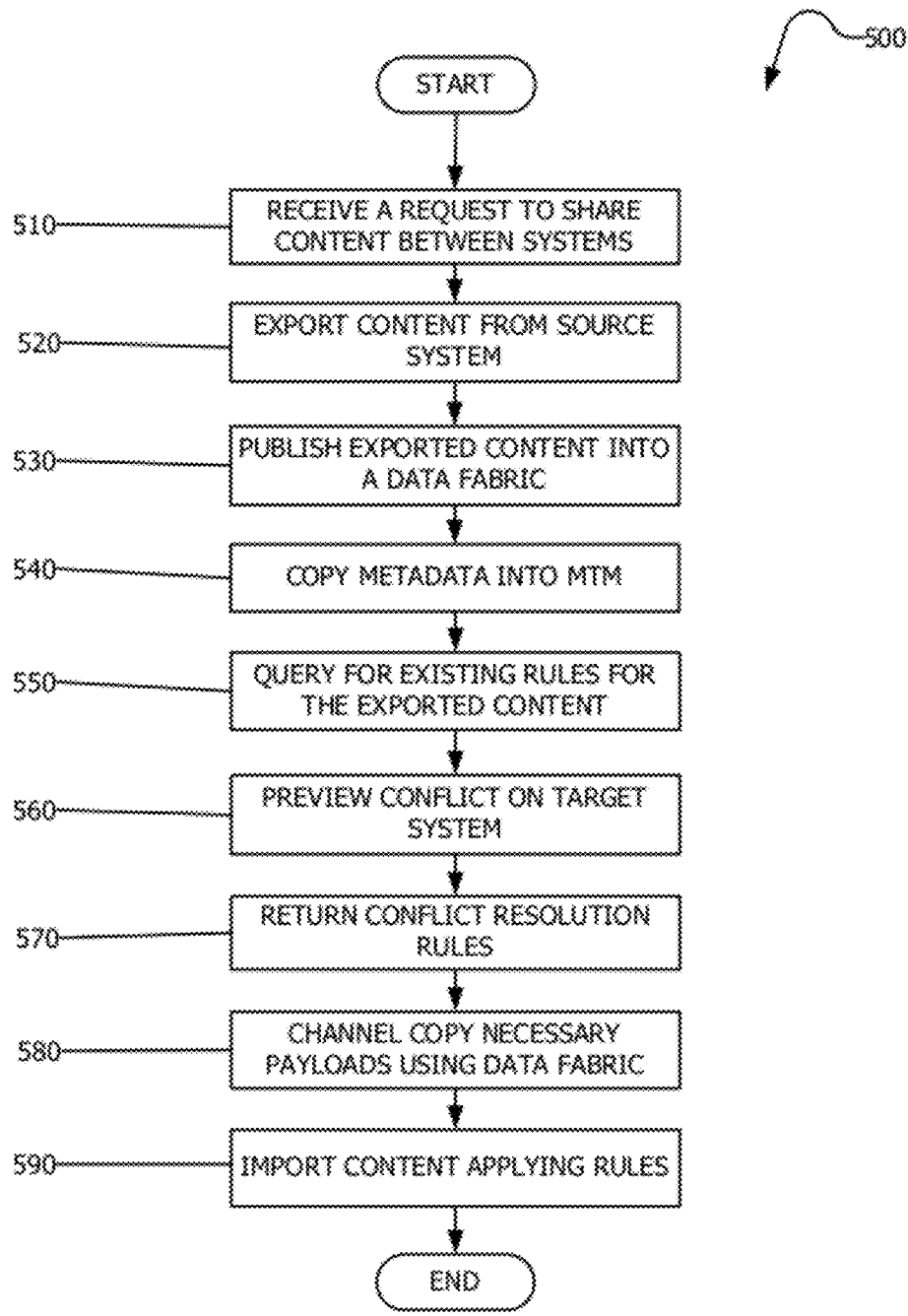
FIG. 5 illustrates, in flowchart form, a method for sharing contents between systems using an intelligent content sharing system according to one embodiment.

FIG. 5 illustrates example process 500 that utilizes an MTM to share contents between systems. At block 510, when content is changed on a source system, a request is generated to share the content to the target system. The request is received at the MTM. In one embodiment, a user may instruct the MTM to share contents between systems, a request is generated for the user interaction. At block 520, Business Logic Unit 422 issues a command to export data from the source system. In one embodiment, an Import/Export system is utilized to export the data. After the data is exported from the source system, Business Logic Unit 422 publishes the exported data into a data fabric in the MTM, block 530.

A data fabric is a mechanism used to distribute binary data amongst multiple systems. The characteristics of a data fabric include the capability to place binary data in one location, and have that information available in many locations within a network. The capabilities and technical sophistication of the fabric can vary. A data fabric maybe a simple as a single data source accessible via a number of protocols, including, but not limited to, the File Transfer Protocol (FTP), Network File Protocol (NFS), or a distributed Storage Area Network (SAN). In a more sophisticated data-fabric implementation, binary information can be transferred and kept synchronized between different geographic locations over a wide area network (WAN). This can be achieved via many known mechanisms, including RSYNC. One manifestation of a data fabric is embedded within BMC Bladelogic Client Automation product where files are placed into "channels" and available via all agents that have access to the channel. Channels can be copied over a WAN using a Channel Copy operation.

In one embodiment, export process and publish process may be combined in one API call. The API may return a reference to a progress indicator that can be queried by the MTM for status of the transfer. Once the status has indicated that the publication process has completed, a metadata for the transfer is copied to the MTM, block 540. The metadata may contain information for the import process, including a representation of all objects to be imported, and references to dependencies. In one embodiment, the metadata is an XML file.

Next, Rule Engine 420 queries rule database to search for any rules predefined for the data being transferred, block 550. If a rule exists for the data being transferred, that rule is retrieved by Rule Engine 420. Generic rules (or global rules) are also retrieved.

At block 560, Business Logic Unit 422 issues a preview API call to execute on the target system to preview potential conflict using the metadata copied in block 540. In one embodiment, the preview process is implemented as attempting to import the data into the target system without making any changes. In one embodiment, a piece of data in the content is remapped to a local file on the target system, as a result of the preview, the MTM determines that piece of data is not needed necessary for the target system, the MTM will not copy that data to the target system. If the preview process finds a potential conflict for an object in the content, the MTM will determine conflict resolution rules for the potential conflict, block 570. If there exist one or more predefined rules associated with the potential conflict, the one or more predefined rules are retrieved. If no predefined rule exists, the MTM may provide a set of conflict resolving options for the user. The user may choose one of the options to resolve the conflict. The user may also provide his/her own conflict resolution mechanism. Rule Engine 420 returns the user's conflict resolution as a rule which contains the source and target contents, along with the status information. In one embodiment, the preview of conflict and returning of conflict resolution rules steps may be repeated many times until all conflicts are resolved, as previous conflict resolutions may result in new conflicts.

At block 580, the MTM copies all necessary payloads from the source system to the target system using the data fabric. The payloads copied may be in binary format, and frequently in very large size. In one embodiment, necessary payloads are stored in "channels" that can be retrieved from anywhere in the system 400. In one embodiment, if a copy of an object already exists on the target system, the MTM may only copy the difference (the delta) of the object from the source system to the target system. If the data fabric is sophisticated enough, MTM 410 may combine the copy and conflict resolution steps at the same time.

At block 590, MTM 410 retrieves the published data from the data fabric and import the data into the target system applying the conflict resolution rules. In one embodiment, Business Logic Unit 422 issues an API call to retrieve the published data from the data fabric and to import the data, Rule Engine 420 applies resolution rules to the data being imported. In one embodiment, the import process is executed asynchronously. The API may return a progress indicator that can be queried by the MTM for status of the transfer.

In one embodiment, process 500 is modified to allow MTM 410 exporting data from the target system before importing new data into the target system. This modification of process 500 may allow MTM 410 to offer the capability to "undo" an import process after the import has been completed. In order to achieve the undo functionality, MTM 410 collects information for all nodes in the import graph, finds the corresponding peer of each node in the target system. For each peer in the target system, MTM 410 collects its dependency graph, and unites all the dependency graphs together to form a complete dependency graph.

This paper discloses one of the main applications of the MTM: conflict resolution, however, the application of the MTM is not limited to the resolution of conflicts. The MTM, as a middleman, has the overall function of coordinating and overseeing the sharing process. This includes, but is not limited to: visibility to the different sites; coordinating a continuous content sharing process; enabling various methods of conflict resolutions being re-played in the continuous process (through the rule engine); enabling a non-trivial sharing process with changes of identity (through the rule engine); enabling undo; awareness to changes in different sites, thus triggering the process if needed and enabling a continuous process, etc.

Figure 6:
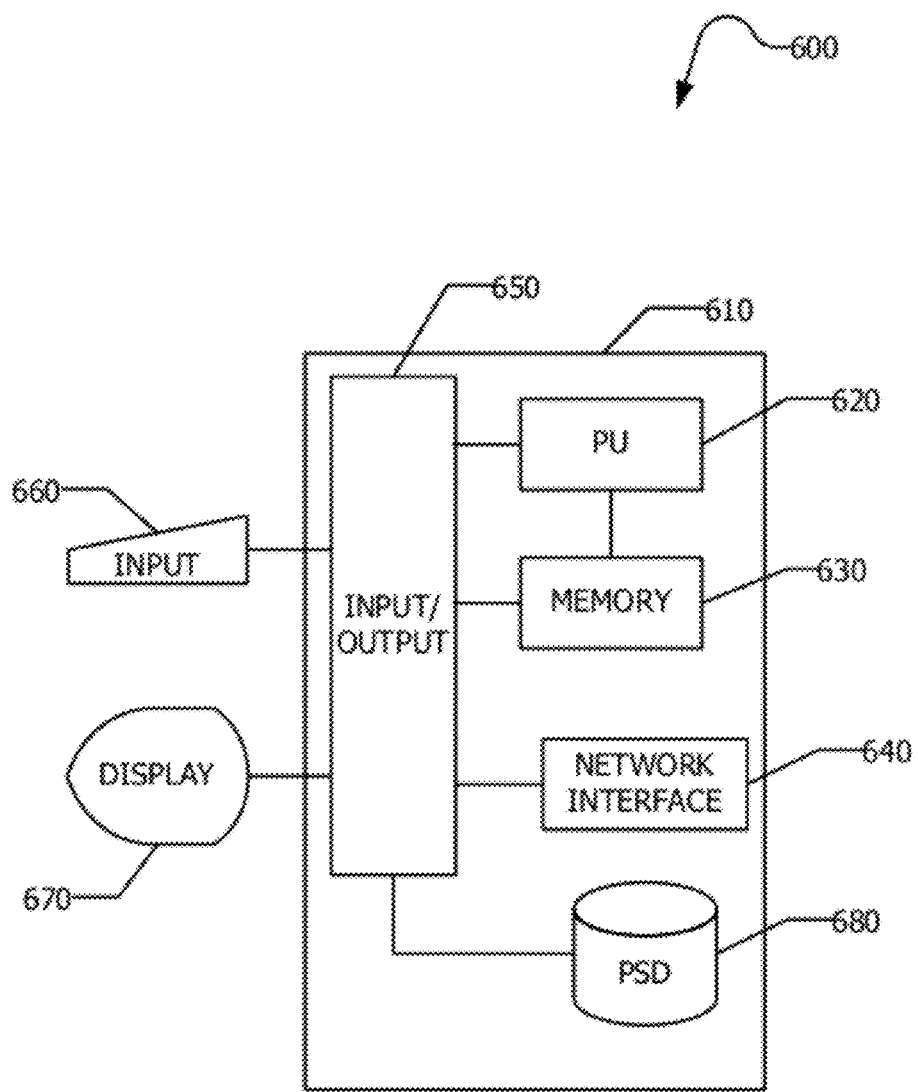
FIG. 6 illustrates, in block diagram form, an example computer system that may be utilized to implement various embodiments disclosed herein.

FIG. 6 shows example computer system 600. Example computer system 600 may be used as MTM 410. Example computer system 600 comprises system unit 610 which may be optionally connected to input device 660 (e.g., keyboard, mouse, touch screen, etc.) and display 670. Program storage device (PSD) 680 is included within system unit 610. Also included within system unit 610 is network interface 640 for communication with other devices via a network (not shown). Network interface 640 may be included within system unit 610 or be external to system unit 610. In either case, system unit 610 may be communicatively coupled to network interface 640. Program storage device 680 represents any form of non-volatile storage including, but not limited to, all forms of optical and magnetic storage, including solid-state storage elements and removable media. Program storage device 680 may be used for storage of software to control system unit 610, data for use by computer system 600, or both.

System unit 610 may be programmed to perform methods in accordance with this disclosure (an example of which is shown in FIG. 5). System unit 610 comprises processor unit (PU) 620, input-output (I/O) interface 650 and memory 630. Processing unit 620 may include any programmable controller device including, for example, one or more members of the Intel Atom®, Core®, Pentium® and Celeron® processor families from Intel and the Cortex and ARM processor families from ARM. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company.) Memory 630 may include one or more memory modules and comprise random access memory (RAM), read only memory (ROM), programmable read only memory (PROM), programmable read-write memory, and solid-state memory. One of ordinary skill in the art will also recognize that PU 620 may also include some internal memory including, for example, cache memory.

In addition, acts in accordance with the method of FIG. 5 may be performed by example computer system 600 including a single computer processor, a special purpose processor (e.g., a digital signal processor, "DSP"), a plurality of processors coupled by a communications link or a custom designed state machine, or other device capable of executing instructions organized into one or more program modules. Custom designed state machines may be embodied in a hardware device such as an integrated circuit including, but not limited to, application specific integrated circuits ("ASICs") or field programmable gate array ("FPGAs").

Various changes in the components as well as in the details of the illustrated operational method are possible without departing from the scope of the following claims. For example, the illustrative system of FIG. 4 may be comprised of more than one computer communicatively coupled via a communication network, wherein the computers may be mainframe computers, minicomputers, workstations or any combination of these. Further, monitored applications may execute on multiple hardware platforms. Such a network may be composed of one or more local area networks, one or more wide area networks, or a combination of local and wide-area networks. In addition, the networks may employ any desired communication protocol and further may be "wired" or "wireless." Acts in accordance with FIG. 5 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A computer-implemented method of sharing content between computer systems using a Multi-Topology Middleman (MTM), the method comprising:
   receiving, at the MTM, a request to share content in a first computer system to a second computer system;
   exporting, by the MTM, the content from the first computer system;
   publishing the content to a data fabric;
   copying metadata of the content to the MTM;
   previewing conflicts of the content with existing data on the second computer system;
   returning one or more rules for the content;
   importing the content from the data fabric to the second computer system; and
   applying the one or more rules to the content on the second computer system.

2. The computer-implemented method of claim 1 further comprising detecting a change in content on one of the computer systems.

3. The computer-implemented method of claim 1, wherein the request is initiated by a user.

4. The computer-implemented method of claim 1 wherein the act of previewing comprises attempting to import the content to the second computer system without making any changes based on the metadata.

5. The computer-implemented method of claim 1, wherein the act of returning one or more rules comprises querying a rule database for existing rules for an object in the content.

6. The computer-implemented method of claim 1, wherein the one or more rules comprise conflict resolution rules.

7. The computer-implemented method of claim 1, wherein the one or more rules comprise data manipulation rules.

8. The computer-implemented method of claim 1, wherein the act of returning one or more rules comprises:
   recording steps of resolving conflicts if conflicts previewed; and
   storing the recorded steps as a rule for the content.

9. The computer-implemented method of claim 1 further comprising channel copying necessary payloads of the content using the data fabric.

10. The computer-implemented method of claim 1 further comprising undoing the act of importing.

11. The computer-implemented method of claim 1 further comprising applying the one or more rules to the content on the MTM.

12. A computer-implemented system providing continuous content sharing, the system comprising:

a processor;

storage operatively coupled to the processor; and a software module stored in the storage, the software module comprising instructions that when executed by the processor cause the processor to perform the method of claim 1.

13. A programmable storage device having programmed instructions stored thereon for causing a programmable control device to perform a method according to claim 1.

14. A networked computer system comprising:

a plurality of computers communicatively coupled, at least one of the plurality of computers programmed to perform at least a portion of the method of claim 1 wherein the entire method of claim 1 is performed collectively by the plurality of computers.

15. The computer-implemented method of claim 8 further comprising providing one or more conflict resolution options to a user.

16. The computer-implemented method of claim 8, wherein the rule comprises renaming an object in the content to a new name in the second computer system if the name of that object already exists in the second computer system.

17. The computer-implemented method of claim 8, wherein the rule comprises mapping an object in the content to an existing object in the second computer system.

18. The computer-implemented method of claim 8, wherein the rule comprises a sequence of rules.

19. The computer-implemented method of claim 18, wherein the act of applying one or more rules comprises executing the sequence of rules sequentially.

* * * * *